United States Patent
Huang et al.

(10) Patent No.: US 12,003,115 B2
(45) Date of Patent: Jun. 4, 2024

(54) DUAL RECEIVER DETECTION APPARATUS AND METHOD FOR WIRELESS POWER TRANSFER SYSTEM

(71) Applicant: Nuvolta Technologies (Hefei) Co., Ltd., Hefei (CN)

(72) Inventors: Lei Huang, Shenzhen (CN); Chaoxi Wang, Shanghai (CN); Zeng Li, Shanghai (CN); Jun Liu, Shenzhen (CN); Shi Song, Shanghai (CN)

(73) Assignee: NuVolta Technologies (Hefei) Co., Ltd., Hefei (CN)

(*) Notice: Subject to any disclaimer, the term of this patent is extended or adjusted under 35 U.S.C. 154(b) by 510 days.

(21) Appl. No.: 17/328,070

(22) Filed: May 24, 2021

(65) Prior Publication Data

US 2022/0368167 A1    Nov. 17, 2022

(30) Foreign Application Priority Data

May 17, 2021  (CN) .......................... 202110538990.4

(51) Int. Cl.
*H02J 50/90*    (2016.01)
*H02J 50/10*    (2016.01)
*H02J 50/40*    (2016.01)

(52) U.S. Cl.
CPC .............. *H02J 50/40* (2016.02); *H02J 50/10* (2016.02); *H02J 50/90* (2016.02); *H02J 2310/22* (2020.01)

(58) Field of Classification Search
CPC ....................................................... H02J 50/90
USPC ....................................................... 320/108
See application file for complete search history.

(56) References Cited

U.S. PATENT DOCUMENTS

| | | | |
|---|---|---|---|
| 8,305,036 B2 | 11/2012 | Toya et al. | |
| 9,935,488 B2 | 4/2018 | Yamanishi et al. | |
| 9,985,463 B2 | 5/2018 | Seki et al. | |
| 10,014,711 B2 | 7/2018 | Iwabuchi | |
| 2010/0315039 A1* | 12/2010 | Terao | H01F 38/14 320/108 |
| 2013/0127254 A1* | 5/2013 | Miichi | H02J 50/402 307/104 |
| 2015/0229156 A1 | 8/2015 | Iwabuchi et al. | |
| 2018/0052649 A1* | 2/2018 | Patel | H02J 50/10 |

\* cited by examiner

*Primary Examiner* — Edward Tso
*Assistant Examiner* — Ahmed H Omar
(74) *Attorney, Agent, or Firm* — AP3 Law Firm PLLC

(57) ABSTRACT

A method includes applying a plurality of detection signals to a plurality of receivers, receiving a plurality of echo signals resulted from the plurality of receivers, comparing the plurality of echo signals with a predetermined echo signal distribution pattern, determining the number of the plurality of receivers, and charging the plurality of receivers sequentially using a movable transmitter.

20 Claims, 13 Drawing Sheets

DUAL RECEIVER DETECTION APPARATUS AND METHOD FOR WIRELESS POWER TRANSFER SYSTEM

PRIORITY CLAIM

This application claims priority to Chinese Patent Application No. 202110538990.4, filed on May 17, 2021, which is hereby incorporated by reference in its entirety.

TECHNICAL FIELD

The present invention relates to a dual receiver detection apparatus and method, and, in particular embodiments, to a dual receiver detection apparatus for a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

In the wireless power transfer system, the transmitter may be inside a charging pad. The receiver may be inside a mobile phone. After the mobile phone is placed on the charging pad, energy is transferred from the charging pad to the mobile phone if the receiver coil of the mobile phone is adjacent to the transmitter coil of the charging pad. However, a user of the mobile phone may not accurately align the receiver coil of the mobile phone with the transmitter coil of the charging pad. Such a misalignment may reduce system efficiency. In order to allow ease of use while offering maximum functionality, a movable transmitter may be employed to accurately align the transmitter coil of the charging pad with the receiver coil of the mobile phone.

As wireless power charging has been widely adopted in the mobile phone industry, a charging pad configured to charge a plurality of mobile phones has become more important. It would be desirable to have a simple and reliable receiver detection apparatus and method to provide a fast and accurate solution under a variety of operating conditions.

SUMMARY

These and other problems are generally solved or circumvented, and technical advantages are generally achieved, by preferred embodiments of the present disclosure which provide a dual receiver detection apparatus and method for a wireless power transfer system.

In accordance with an embodiment, a method comprises applying a plurality of detection signals to a plurality of receivers, receiving a plurality of echo signals resulted from the plurality of receivers, comparing the plurality of echo signals with a predetermined echo signal distribution pattern, determining the number of the plurality of receivers, and charging the plurality of receivers sequentially using a movable transmitter.

In accordance with another embodiment, a method comprises receiving a plurality of echo signals through a detection grid over a movable transmitter, comparing the plurality of echo signals with a predetermined echo signal distribution pattern, determining whether a plurality of receivers is in parallel or in a misalignment manner, and charging the plurality of receivers sequentially using a movable transmitter.

In accordance with yet another embodiment, an apparatus comprises a movable transmitter, a detection grid over the movable transmitter, and a controller configured to apply a plurality of detection signals to a plurality of receivers over the detection grid, receive a plurality of echo signals resulted from the plurality of receivers, compare the plurality of echo signals with a predetermined echo signal distribution pattern, and determine the number of the plurality of receivers.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a dual receiver detection apparatus and method for a wireless power transfer system. The invention may also be applied, however, to a variety of power systems. Hereinafter, various embodiments will be explained in detail with reference to the accompanying drawings.

Figure 1:
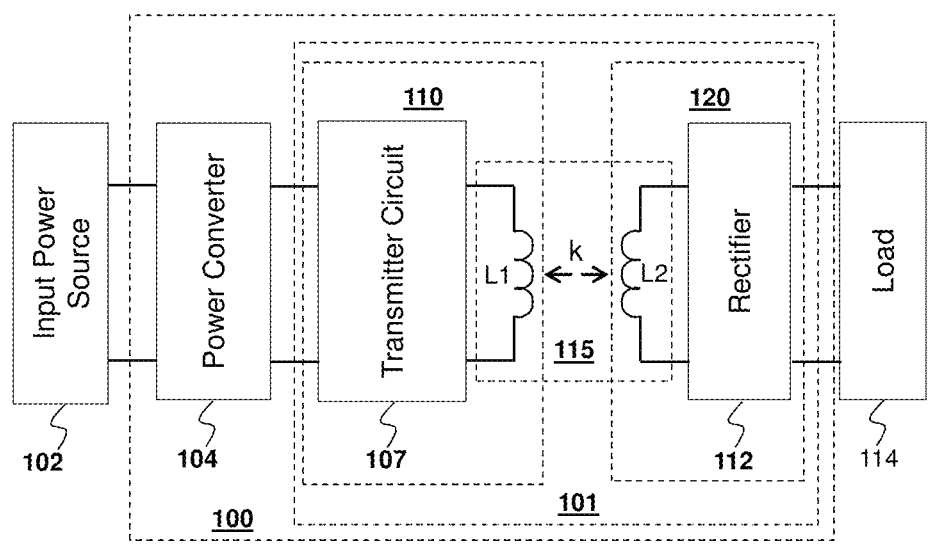
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. The wireless power transfer device 101 includes a transmitter 110 and a receiver 120. As shown in FIG. 1, the transmitter 110 comprises a transmitter circuit 107 and a transmitter coil L1 connected in cascade. The input of the transmitter circuit 107 is coupled to an output of the power converter 104. The receiver 120 comprises a receiver coil L2 and a rectifier 112 connected in cascade. The output of the rectifier 112 is coupled to the load 114.

The transmitter 110 is magnetically coupled to the receiver 120 through a magnetic field when the receiver 120 is placed near the transmitter 110. A loosely coupled transformer 115 is formed by the transmitter coil L1, which is part of the transmitter 110, and the receiver coil L2, which is part of the receiver 120. As a result, power may be transferred from the transmitter 110 to the receiver 120.

In some embodiments, the transmitter 110 may be inside a charging pad. The transmitter coil is placed underneath the top surface of the charging pad. The receiver 120 may be embedded in a mobile phone. When the mobile phone is place near the charging pad, a magnetic coupling may be established between the transmitter coil and the receiver coil. In other words, the transmitter coil and the receiver coil may form a loosely coupled transformer through which a power transfer occurs between the transmitter 110 and the receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the transmitter 110 and the receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be an energy storage device such as rechargeable batteries, fuel cells and/or the like.

The load 114 represents the power consumed by the mobile device (e.g., a mobile phone) coupled to the receiver 120. Alternatively, the load 114 may refer to a rechargeable battery and/or batteries connected in series/parallel, and coupled to the output of the receiver 120.

The transmitter circuit 107 may comprise primary side switches of a full-bridge power converter according to some embodiments. The full-bridge is also known as an H-bridge. Alternatively, the transmitter circuit 107 may comprise the primary side switches of other converters such as a half-bridge converter, a push-pull converter and the like. The detailed configuration of the transmitter circuit 107 will be described below with respect to FIG. 2.

It should be noted that the converters described above are merely examples. One having ordinary skill in the art will recognize other suitable power converters such as class E topology based power converters (e.g., a class E amplifier), may alternatively be used.

The transmitter circuit 107 may further comprise a resonant capacitor. The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The receiver 120 comprises the receiver coil L2 magnetically coupled to the transmitter coil L1 after the receiver 120 is placed near the transmitter 110. As a result, power may be transferred to the receiver coil and further delivered to the load 114 through the rectifier 112. The receiver 120 may comprise a secondary resonant capacitor.

The rectifier 112 converts an alternating polarity waveform received from the output of the receiver coil L2 to a single polarity waveform. In some embodiments, the rectifier 112 is implemented as a synchronous rectifier including four switches. In alternative embodiments, the rectifier 112 comprises a full-wave diode bridge and an output capacitor.

Furthermore, the synchronous rectifier may be formed by any controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

The power converter 104 is coupled between the input power source 102 and the input of the wireless power transfer device 101. Depending design needs and different applications, the power converter 104 may comprise many different configurations. In some embodiments, the power converter 104 may be a non-isolated power converter such as a buck converter. In some embodiments, the power converter 104 may be implemented as a linear regulator. In some embodiments, the power converter 104 may be an isolated power converter such as a forward converter.

The implementation of the power converter 104 described above is merely an example, which should not unduly limit the scope of the claims. One of ordinary skill in the art would recognize many variations, alternatives, and modifications. Furthermore, depending on different applications and design needs, the power converter 104 may be an optional element of the wireless power transfer system 100. In other words, the input power source 102 may be connected to the transmitter circuit 107 directly.

FIG. 1 shows one receiver magnetically coupled to the transmitter. Depending on different applications, multiple receivers may be magnetically coupled to one single transmitter. For example, the transmitter may be inside a charging pad. The top surface of the charging pad is able to accommodate a plurality of mobile phones (e.g., two mobile phones). Each mobile phone comprises a receiver, which has a structure similar to that show in FIG. 1. The charging pad is configured to charge the plurality of mobile phones sequentially using a movable transmitter. The structure and operating principle of this charging pad will be described below with respect to FIGS. 2-9.

Figure 2:
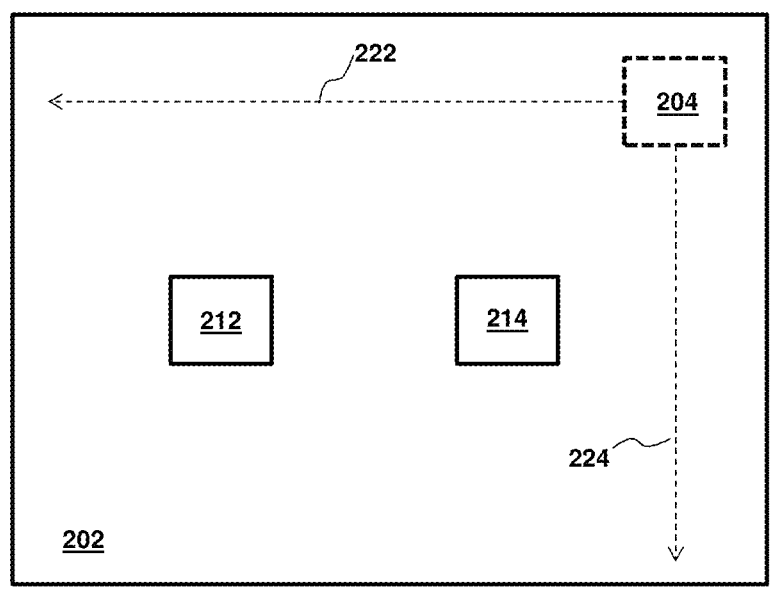
FIG. 2 illustrates a top view of a charging pad in accordance with various embodiments of the present disclosure.

FIG. 2 illustrates a top view of a charging pad in accordance with various embodiments of the present disclosure. The charging pad 202 comprises a movable transmitter 204. In some embodiments, the movable transmitter 204 comprises the transmitter coil L1 shown in FIG. 1. Depending on different applications and design needs, a portion or the entire transmitter 110 may be implemented on the movable transmitter 204. The movable transmitter 204 is capable of moving along a first direction indicated by a first dashed line 222 and a second direction indicated by a second dashed line 224. As shown in FIG. 2, the first direction is orthogonal to the second direction.

In operation, a first receiver 212 and a second receiver 214 may be placed over the charging pad 202. In some embodiments, the first receiver 212 may be embedded in a first mobile phone. The second receiver 214 may be embedded in a second mobile phone. The charging pad provides power for the first mobile phone and the second mobile phone through wireless charging between the movable transmitter 204 and the receivers 212, 214.

The charging pad 202 may further comprise a detection grid and a controller (not shown). The detection grid comprises a plurality of detection coils. The controller is configured to apply a plurality of detection signals using the plurality of detection coils. After one or a plurality of receivers is placed on the charging pad, a plurality of echo signals may be reflected from the one or the plurality of receiver. The controller is configured to receive the plurality of echo signals resulted from the one or the plurality of receivers. The controller compares the plurality of echo signals with a predetermined echo signal distribution pattern. Based on the comparison results, the controller determines the number of the plurality of receivers placed on the charging pad. Throughout the description, the charging pad 202 may be alternatively referred to as a dual receiver detection apparatus.

Furthermore, after determining the number of the plurality of receivers placed on the charging pad, the controller is able to determine the locations of the detected receivers based on comparing the plurality of echo signals with the predetermined echo signal distribution pattern. After detecting the locations of the receivers, the controller is configured to control the movement of the movable transmitter 204 so as to efficiently charge the detected receivers. In particular, the controller is configured to move the movable transmitter toward a location using a two dimensional moving apparatus. In some embodiments, the two dimensional moving apparatus is placed inside the charging pad. The two dimensional moving apparatus comprises a first motor configured to move the movable transmitter along the first direction 222 and a second motor configured to move the movable transmitter along the second direction 224. By moving the movable transmitter, the transmitter coil is aligned with a targeted receiver coil. As such, the movable transmitter is able to charge the detected receivers sequentially.

Figure 3:
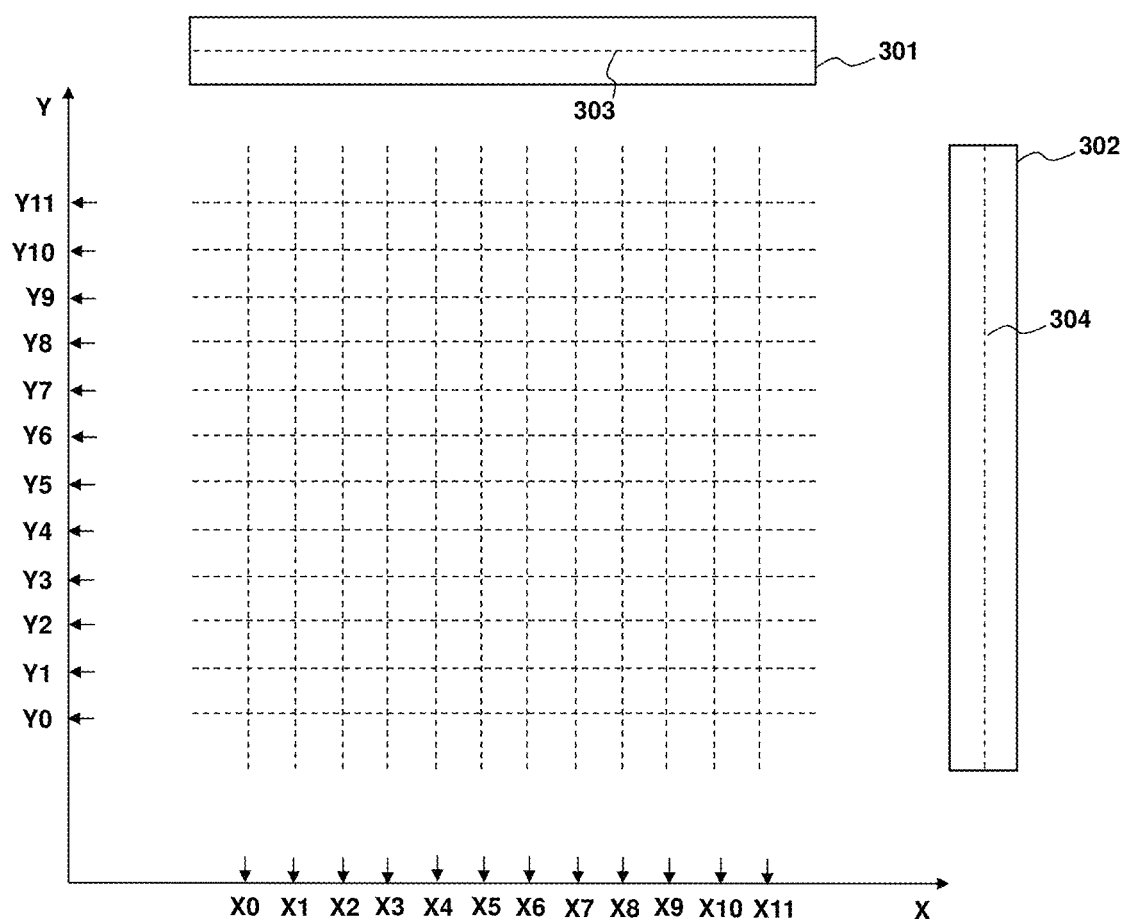
FIG. 3 illustrates a top view of a detection grid in accordance with various embodiments of the present disclosure.

FIG. 3 illustrates a top view of a detection grid in accordance with various embodiments of the present disclosure. The detection grid comprises a plurality of first detection coils 301 oriented to a first direction, and a plurality of second detection coils 302 oriented to a second direction. As shown in FIG. 3, the first direction is orthogonal to the second direction. In some embodiments, the plurality of first detection coils 301 may be implemented in a multi-layer PCB board. Each first detection coil may partially overlap its adjacent first detection coils. For simplifying the illustration of the detection grid, a dashed line 303 is used to represent the first detection coil 301. Likewise, the plurality of second detection coils 302 may be implemented in the same multi-layer PCB board. Each second detection coil may partially overlap its adjacent second detection coils. For simplifying the illustration of the detection grid, a dashed line 304 is used to represent the second detection coil 302.

As shown in FIG. 3, twelve horizontal dashed lines are arranged in equally spaced relation from Y0 to Y11. Each horizontal dashed line represents a first detection coil 301. Throughout the description, the horizontal dashed line may be alternatively referred to as the first detection coil 301.

As shown in FIG. 3, each first detection coil 301 is aligned with a corresponding location of the Y axis. Throughout the description, the corresponding location of the Y axis may be used to label the first detection coil. For example, the first detection coil aligned with Y0 may be alternatively referred to as the first detection coil Y0.

As shown in FIG. 3, twelve vertical dashed lines are arranged in equally spaced relation from X0 to X11. Each vertical dashed line represents a second detection coil 302. Throughout the description, the vertical dashed line may be alternatively referred to as the second detection coil 302.

As shown in FIG. 3, each second detection coil 302 is aligned with a corresponding location of the X axis. Throughout the description, the corresponding location of the X axis may be used to label the second detection coil. For example, the second detection coil aligned with X0 may be alternatively referred to as the second detection coil X0.

In operation, a plurality of detection signals may be applied to the first detection coils 301 and the second detection coils 302. In some embodiments, the detection signals may be applied to the detection coils sequentially. After a receiver is placed over the detection grid, a plurality of echo signals may be reflected from the coil of the receiver. The detection coils are configured to receive the echo signals. Depending on different locations of the detection coils, the strength of the echo signal received by each detection coil may vary accordingly.

The charging pad may be able to accommodate two mobile phones. The user has freedom of positioning these two mobile phones on the top surface of the charging pad.

There may be a plurality of arrangements of these two mobile phones. In response to a specific arrangement of the mobile phones, the echo signals may form a specific signal distribution pattern. The controller is able to find the locations of these two mobile phones based on the signal distribution pattern of the echo signals. FIGS. 4-7 illustrates four different arrangements of the two mobile phones.

The receiver of the mobile phone is magnetically coupled to the transmitter of the charging pad. As such, the receiver is the most relevant portion for illustrating various embodiments of the present disclosure. For simplicity, the mobile phone may be alternatively referred to as a receiver.

Figure 4:
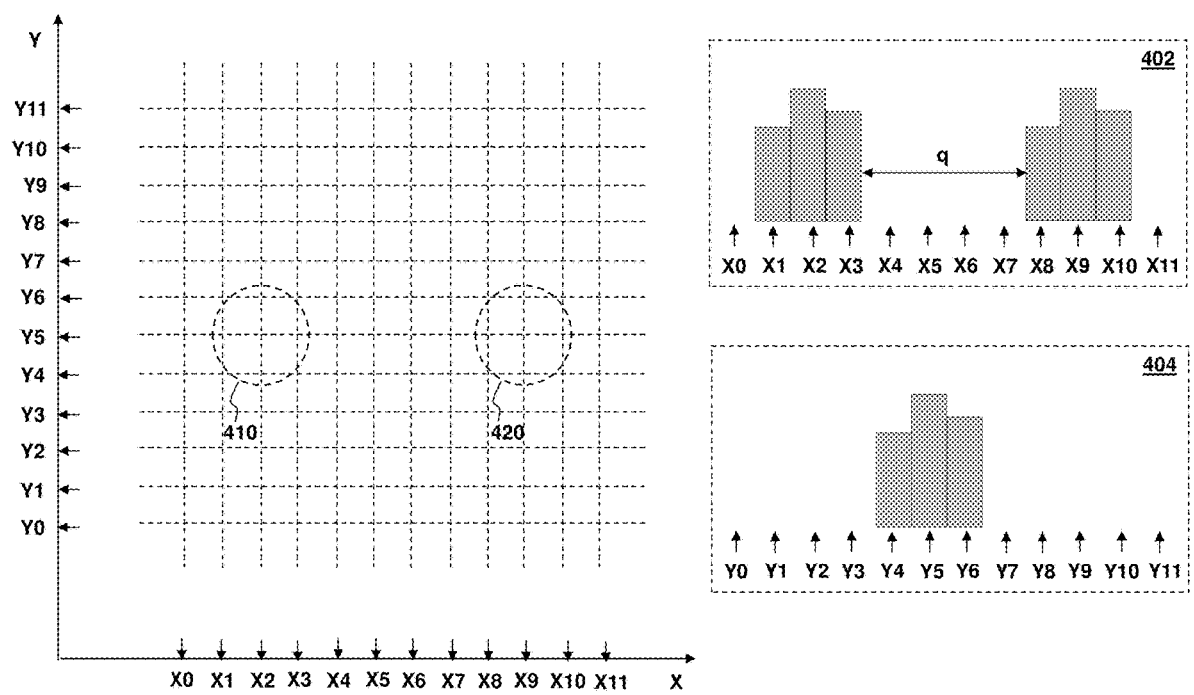
FIG. 4 illustrates a first arrangement of two receivers on a detection grid in accordance with various embodiments of the present disclosure.

FIG. 4 illustrates a first arrangement of two receivers on a detection grid in accordance with various embodiments of the present disclosure. A first receiver 410 and a second receiver 420 are placed in parallel, but separated from each other. As shown in FIG. 4, the first receiver 410 is over detection coils Y4, Y5 and Y6 along the Y axis, and over detection coils X1, X2 and X3 along the X axis. The second receiver 420 is over detection coils Y4, Y5 and Y6 along the Y axis, and over detection coils X8, X9 and X10 along the X axis.

In the dashed rectangle 402, the echo signals received by the second detection coils are illustrated. Since the first receiver 410 and the second receiver 420 are separated from each other, two groups of echo signals are received by the second detection coils. A first group of echo signals includes three echo signals. A first echo signal is generated by detection coil X1. A second echo signal is generated by detection coil X2. A third echo signal is generated by detection coil X3. Since the center of the first receiver 410 is aligned with X2, the amplitude of the second echo signal is the greatest in the first group. A second group of echo signals includes three echo signals. A fourth echo signal is generated by detection coil X8. A fifth echo signal is generated by detection coil X9. A sixth echo signal is generated by detection coil X10. Since the center of the second receiver 420 is aligned with X9, the amplitude of the fifth echo signal is the greatest in the second group.

As shown in FIG. 4, the distance between the rightmost echo signal of the first group and the leftmost echo signal of the second group is defined as q. Based on the value of q, the controller is able to determine the number of receivers over the charging pad. In particular, q is compared with $N_D$. $N_D$ is a predetermined threshold value for determining whether two receivers are on the detection grid. If q is greater than $N_D$, two receivers are placed over the charging pad.

In the dashed rectangle 404, the echo signals received by the first detection coils are illustrated. Since the first receiver 410 and the second receiver 420 are in parallel with reference to the Y axis, one group of echo signals are received by the first detection coils. A first echo signal of this group is generated by detection coil Y4. A second echo signal of this group is generated by detection coil Y5. A third echo signal of this group is generated by detection coil Y6. Since the centers of the first receiver 410 and the second receiver 420 are aligned with Y5, the amplitude of the second echo signal of this group is the greatest in this group.

As shown in FIG. 4, the number of the echo signals of this group is defined as p. Based on the value of p, the controller is able to determine whether these two receivers are in parallel. In particular, p is compared with M. M is a predetermined number of echo signals for determining whether two receivers are in parallel. If p is less than or equal to M, these two receivers are placed in parallel over the charging pad. On the other hand, if p is greater than M, these two receivers are not in parallel.

As shown in FIG. 4, two receivers are in parallel, but separated from each other. The echo signal distribution pattern in the rectangle 402 indicates there are two receivers separated from each other. The echo signal distribution pattern in the rectangle 404 indicates only one receiver (p<M). Since the echo signal distribution pattern in the rectangle 402 has identified two received, the echo signal distribution pattern in the rectangle 404 can be interpreted as two receivers are in parallel. The controller is able to determine the locations of these two receivers based on the echo signal distribution patterns shown in FIG. 4.

Figure 5:
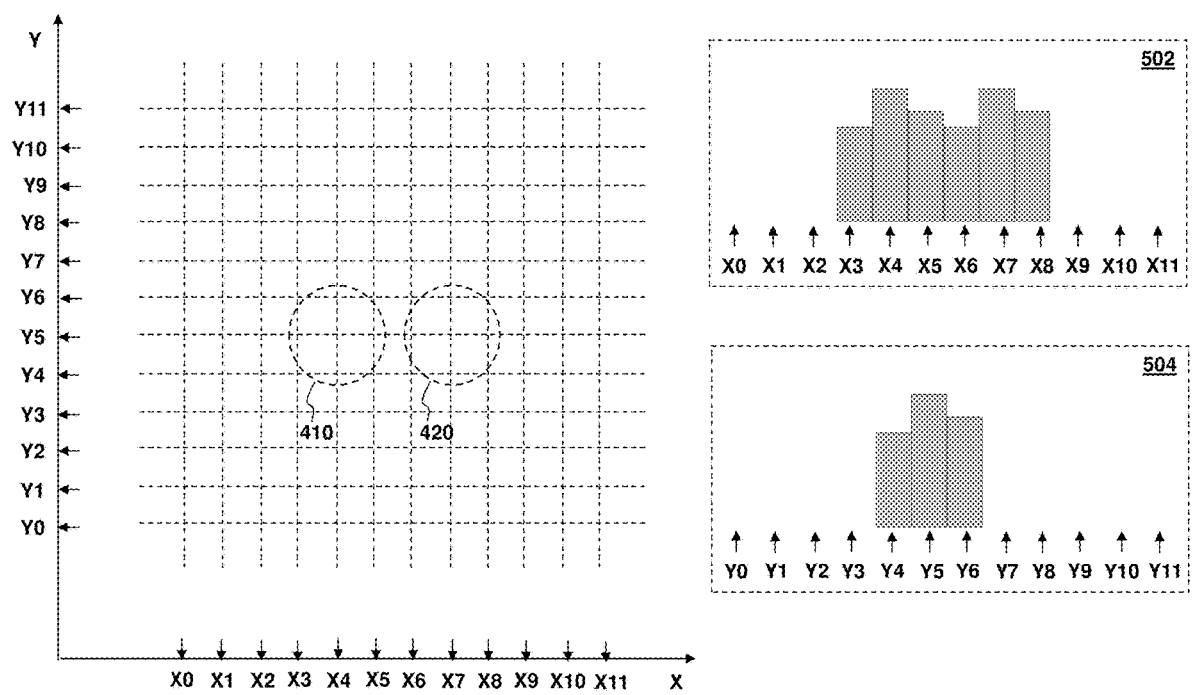
FIG. 5 illustrates a second arrangement of two receivers on a detection grid in accordance with various embodiments of the present disclosure.

FIG. 5 illustrates a second arrangement of two receivers on a detection grid in accordance with various embodiments of the present disclosure. A first receiver 410 and a second receiver 420 are placed in parallel, and adjacent to each other. As shown in FIG. 5, the first receiver 410 is over detection coils Y4, Y5 and Y6 along the Y axis, and over detection coils X3, X4 and X5 along the X axis. The second receiver 420 is over detection coils Y4, Y5 and Y6 along the Y axis, and over detection coils X6, X7 and X8 along the X axis.

In the dashed rectangle 502, the echo signals received by the second detection coils are illustrated. Since the first receiver 410 and the second receiver 420 are adjacent to each other, one groups of echo signals are received by the second detection coils. A first echo signal of this group is generated by detection coil X3. A second echo signal is generated by detection coil X4. A third echo signal is generated by detection coil X5. A fourth echo signal is generated by detection coil X6. A fifth echo signal is generated by detection coil X7. A sixth echo signal is generated by detection coil X8. Since the center of the first receiver 410 and the center of the second receiver 420 are aligned with X4 and X7 respectively, the amplitudes of the second echo signal and the fifth echo signal are the greatest in this group. As shown in FIG. 5, the number of the echo signals of this group is defined as p. Based on the value of p, the controller is able to determine the number of receivers. In particular, p is compared with $N_N$. $N_N$ is a threshold number of echo signals in one group. This threshold number is used for determining whether two receivers are on the detection grid. If p is greater than or equal to $N_N$, and only one group of echo signals are detected, there are two receivers over the detection grid.

In the dashed rectangle 504, the echo signals received by the first detection coils are illustrated. Since the first receiver 410 and the second receiver 420 are in parallel with reference to the Y axis, one group of echo signals are received by the first detection coils. A first echo signal of this group is generated by detection coil Y4. A second echo signal of this group is generated by detection coil Y5. A third echo signal of this group is generated by detection coil Y6. Since the centers of the first receiver 410 and the second receiver 420 are aligned with Y5, the amplitude of the second echo signal of this group is the greatest in this group. As shown in FIG. 5, the number of the echo signals of this group is defined as p. Based on the value of p, the controller is able to determine whether these two receivers are in parallel. In particular, p is compared with M. If p is less than or equal to M, these two receivers are placed in parallel over the charging pad. On the other hand, if p is greater than M, these two receivers are not in parallel.

As shown in FIG. 5, two receivers are in parallel, and adjacent to each other. The echo signal distribution pattern in the rectangle 502 indicates there are two receivers adjacent to each other. The echo signal distribution in the rectangle 504 indicates two receivers at a same location with respect to the Y axis. In other words, these two receivers are in parallel. The controller is able to determine the locations of these two receivers based on the echo signals shown in FIG. 5.

Figure 6:
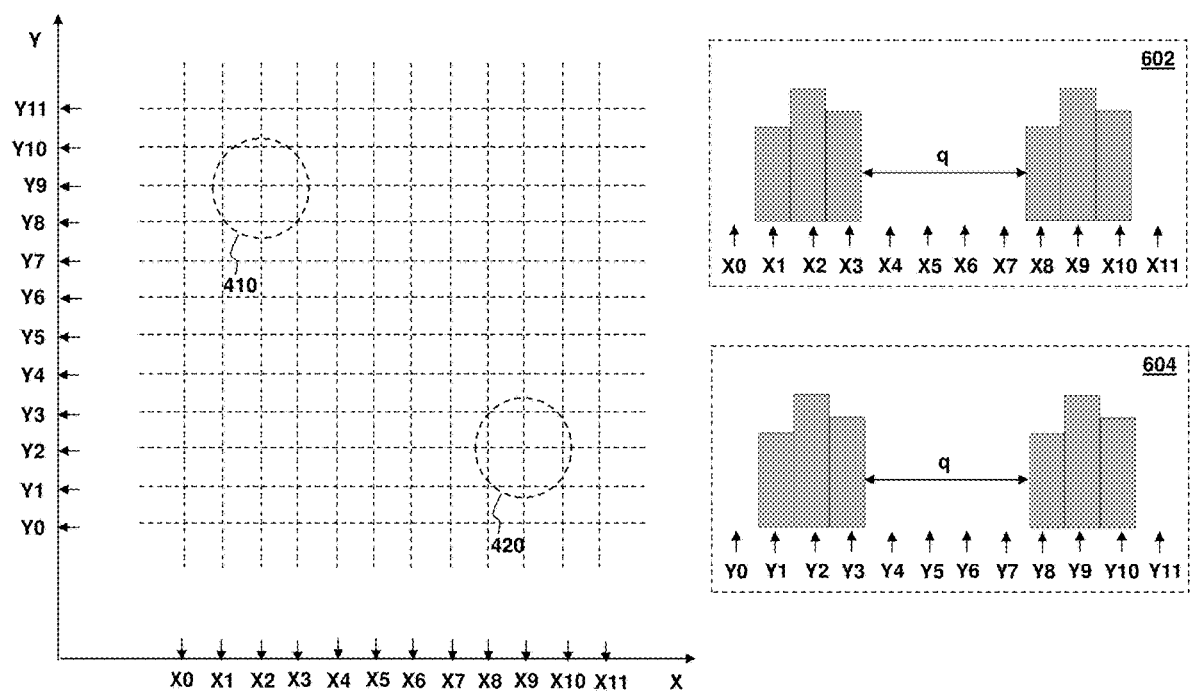
FIG. 6 illustrates a third arrangement of two receivers on a detection grid in accordance with various embodiments of the present disclosure.

FIG. 6 illustrates a third arrangement of two receivers on a detection grid in accordance with various embodiments of the present disclosure. A first receiver 410 and a second receiver 420 are not placed in parallel or in a misalignment manner. In addition, these two receivers are separated from each other. As shown in FIG. 6, the first receiver 410 is over detection coils Y8, Y9 and Y10 along the Y axis, and over detection coils X1, X2 and X3 along the X axis. The second receiver 420 is over detection coils Y1, Y2 and Y3 along the Y axis, and over detection coils X8, X9 and X10 along the X axis.

In the dashed rectangle 602, the echo signals received by the second detection coils are illustrated. Since the first receiver 410 and the second receiver 420 are separated from each other, two groups of echo signals are received by the second detection coils. A first group of echo signals includes three echo signals. A first echo signal is generated by detection coil X1. A second echo signal is generated by detection coil X2. A third echo signal is generated by detection coil X3. Since the center of the first receiver 410 is aligned with X2, the amplitude of the second echo signal is the greatest in the first group. A second group of echo signals includes three echo signals. A fourth echo signal is generated by detection coil X8. A fifth echo signal is generated by detection coil X9. A sixth echo signal is generated by detection coil X10. Since the center of the second receiver 420 is aligned with X9, the amplitude of the fifth echo signal is the greatest in the second group.

As shown in FIG. 6, the distance between the rightmost echo signal of the first group and the leftmost echo signal of the second group is defined as q. Based on the value of q, the controller is able to determine the number of receivers over the charging pad. In particular, q is compared with a predetermined threshold value $N_D$. If q is greater than or equal to $N_D$, two receivers are placed over the charging pad. In operation, the controller may check the echo signals of the X axis and the echo signals of the Y axis. In some embodiments, the controller may determine the number of receivers over the charging pad based on the echo signals of the X axis (e.g., the echo signals in the dashed rectangle 602). After determining the number of receivers over the charging pad, the controller may determine whether these two receivers are in parallel based on the echo signals of the other axis (e.g., the echo signals in the dashed rectangle 604).

In the dashed rectangle 604, the echo signals received by the first detection coils are illustrated. Since the first receiver 410 and the second receiver 420 are not in parallel with reference to the Y axis, two groups of echo signals are received by the first detection coils. A first echo signal of the first group is generated by detection coil Y1. A second echo signal of the first group is generated by detection coil Y2. A third echo signal of the first group is generated by detection coil Y3. Since the center of the first receiver 410 is aligned with Y2, the amplitude of the second echo signal of this group is the greatest in the first group. A first echo signal of the second group is generated by detection coil Y8. A second echo signal of the second group is generated by detection coil Y9. A third echo signal of the second group is generated by detection coil Y10. Since the center of the second receiver 420 is aligned with Y9, the amplitude of the second echo signal of the second group is the greatest in the second group.

As shown in the dashed rectangle 604, the distance between the rightmost echo signal of the first group and the leftmost echo signal of the second group is defined as q. The controller compares q with the predetermined threshold value $N_D$. If q is greater than $N_D$, the two receivers are not placed in parallel. If q is less than $N_D$, the controller proceeds with the following steps to determine whether these two receivers are in parallel. The number of the echo signals in the dashed rectangle 604 (the sum of the first group and the second group) is defined as p. Based on the value of p, the controller is able to determine whether these two receivers are in parallel. In particular, p is compared with the predetermined threshold value M. If p is less than or equal to M, these two receivers are placed in parallel over the charging pad. On the other hand, if p is greater than M, these two receivers are not at a same location with respect to the Y axis.

As shown in FIG. 6, two receivers are not in parallel, but separated from each other. The echo signal distribution pattern in the rectangle 602 indicates there are two receivers separated from each other. The echo signal distribution pattern in the rectangle 604 indicates these two receivers not are in parallel. The controller is able to determine the locations of these two receivers based on the echo signals shown in FIG. 6. More particularly, the detection grid is divided into four regions. The upper left region is a (0,0) region. The lower left region is a (1,0) region. The upper right region is a (0,1) region. The lower right region is a (1,1) region. As shown in FIG. 6, the first receiver 410 is placed at the (0,0) region. The second receiver 420 is placed at the (1,1) region. Based on the echo distribution patterns shown in FIG. 6, the controller is able to identify the locations of these two receivers using a suitable search algorithm.

Figure 7:
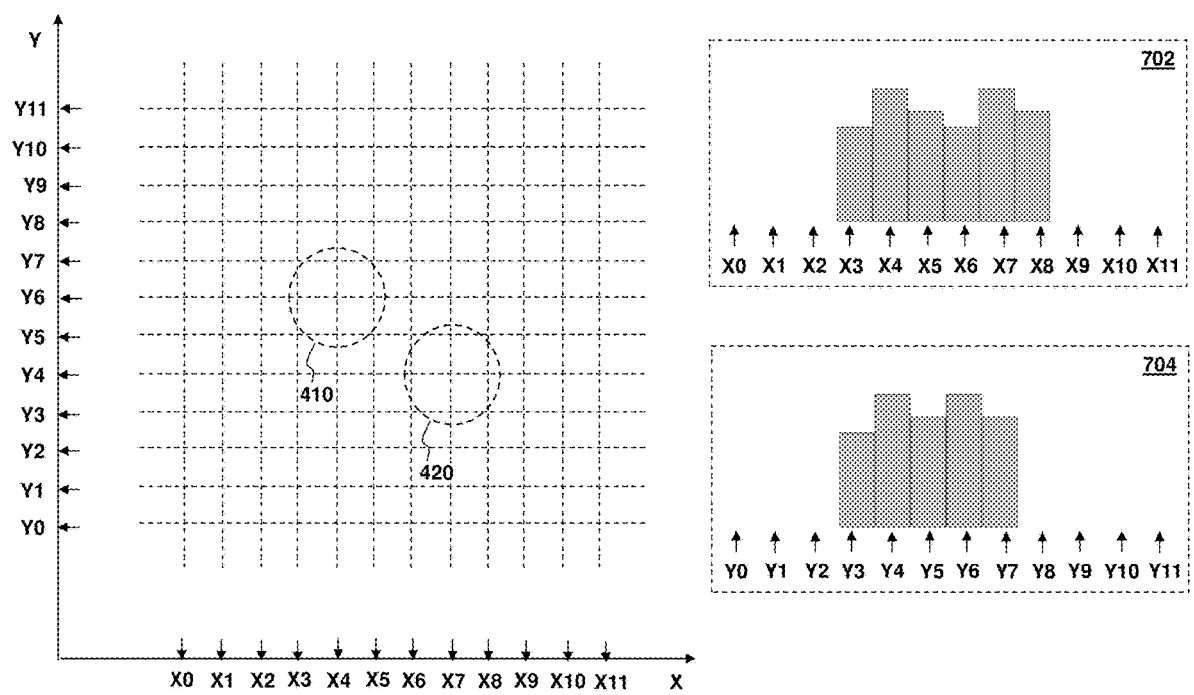
FIG. 7 illustrates a fourth arrangement of two receivers on a detection grid in accordance with various embodiments of the present disclosure.

FIG. 7 illustrates a fourth arrangement of two receivers on a detection grid in accordance with various embodiments of the present disclosure. A first receiver 410 and a second receiver 420 are not placed in parallel. In addition, these two receivers are adjacent to each other. As shown in FIG. 7, the first receiver 410 is over detection coils Y5, Y6 and Y7 along the Y axis, and over detection coils X3, X4 and X5 along the X axis. The second receiver 420 is over detection coils Y3, Y4 and Y5 along the Y axis, and over detection coils X6, X7 and X8 along the X axis.

In the dashed rectangle 702, the echo signals received by the second detection coils are illustrated. Since the first receiver 410 and the second receiver 420 are adjacent to each other, one group of echo signals are received by the second detection coils. A first echo signal is generated by detection coil X3. A second echo signal is generated by detection coil X4. A third echo signal is generated by detection coil X5. A fourth echo signal is generated by detection coil X6. A fifth echo signal is generated by detection coil X7. A sixth echo signal is generated by detection coil X8. Since the centers of the first receiver 410 and the second receiver 420 are aligned with X4 and X7 respectively, the amplitudes of the second echo signal and the fifth echo signal are the greatest in this group.

In some embodiments, the controller may determine the number of receivers over the charging pad based on the echo signals of the X axis (e.g., the echo signals in the dashed rectangle 702). As shown in FIG. 7, the number of the echo signals of the group in the rectangle 702 is defined as p. Based on the value of p, the controller is able to determine the number of receivers. In particular, p is compared with $N_N$. If p is greater than $N_N$, and only one group of echo signals are detected, there are two receivers over the detection grid. After determining the number of receivers over the charging pad, the controller may determine whether these two receivers are in parallel based on the echo signals of the other axis (e.g., the echo signals in the dashed rectangle 704).

In the dashed rectangle 704, the echo signals received by the first detection coils are illustrated. Since the first receiver 410 and the second receiver 420 are not in parallel with reference to the Y axis, but adjacent to each other, one group of echo signals is received by the first detection coils. A first echo signal is generated by detection coil Y3. A second echo signal is generated by detection coil Y4. A third echo signal is generated by detection coil Y5. A fourth echo signal is generated by detection coil Y6. A fifth echo signal is generated by detection coil Y7. Since the centers of the first receiver 410 and the second receiver 420 are aligned with Y4 and Y6 respectively, the amplitudes of the second echo signal and the fourth echo signal are the greatest in this group.

As shown in FIG. 7, the number of the echo signals of this group (echo signals in the dashed rectangle 704) is defined as p. Based on the value of p, the controller is able to determine whether these two receivers are in parallel. In particular, p is compared with M. If p is less than or equal to M, these two receivers are placed in parallel over the charging pad. On the other hand, if p is greater than M, these two receivers are not at a same location with respect to the Y axis.

As shown in FIG. 7, two receivers are not in parallel. In addition, these two receivers are adjacent to each other. The echo signal distribution pattern in the rectangle 702 indicates there are two receivers adjacent to each other. The echo signal distribution pattern in the rectangle 704 indicates these two receivers not are in parallel. The controller is able to determine the locations of these two receivers based on the echo signals shown in FIG. 7. More particularly, the detection grid is divided into four regions. The upper left region is a (0,0) region. The lower left region is a (1,0) region. The upper right region is a (0,1) region. The lower right region is a (1,1) region. As shown in FIG. 7, the first receiver 410 is placed at the (0,0) region. The second receiver 420 is placed at the (1,1) region. Based on the echo distribution patterns shown in FIG. 7, the controller is able to identify the locations of these two receivers using a suitable search algorithm.

Figure 8:
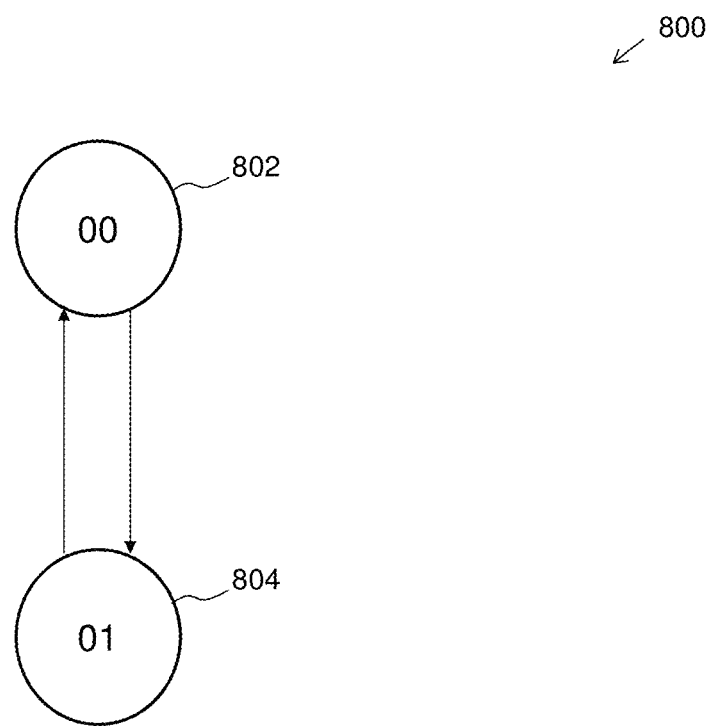
FIG. 8 illustrates a state machine for searching the locations of the receivers in accordance with various embodiments of the present disclosure.

FIG. 8 illustrates a state machine for searching the locations of the receivers in accordance with various embodiments of the present disclosure. The state machine 800 includes two states, namely a first state 802 and a second state 804. The first state 802 corresponds to a first location of two receivers in parallel. The second state 804 corresponds to a second location of the two receivers in parallel. According to the state machine shown in FIG. 8, the state machine 800 allows state transitions between the one state (e.g., state 802) and the other state (e.g., state 804).

Depending on the echo signal distribution patterns, the controller may determine the number of receivers on the detection grid. In response to the echo signal distribution patterns shown in FIGS. 4-5, the controller is able to determine the two locations (00 and 01) of the two receivers. After finding the location of the first receiver, the controller may find the location of the second receiver through a state transition between the state 802 and the state 804.

Figure 9:
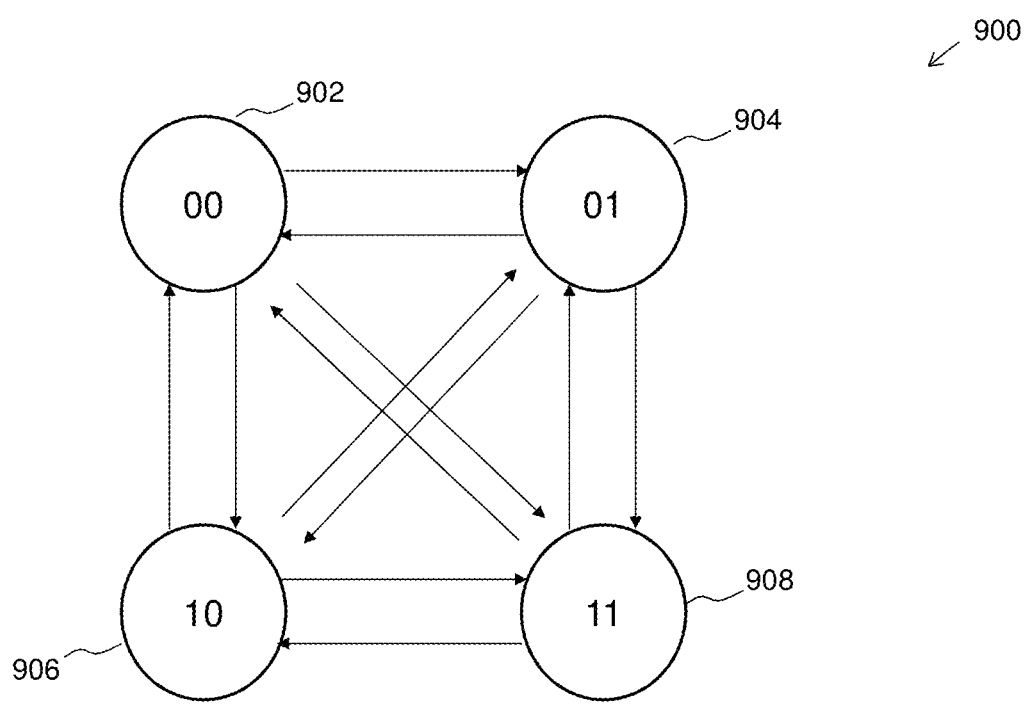
FIG. 9 illustrates a state machine for searching the locations of the receivers in accordance with various embodiments of the present disclosure.

FIG. 9 illustrates a state machine for searching the locations of the receivers in accordance with various embodiments of the present disclosure. The state machine 900 includes four states, namely a first state 902, a second state 904, a third state 906 and a fourth state 908. The first state 902 corresponds to a location in an upper left region of the detection grid. The second state 904 corresponds to a location in an upper right region of the detection grid. The third state 906 corresponds to a location in a lower left region of the detection grid. The fourth state 908 corresponds to a location in a lower right region of the detection grid.

As used herein, the designation state machine is applied to a machine which can be in one of a number of states (e.g., states 902, 904, 906 and 908), the machine being in one state at a time with the ability to change from one state to another (e.g., a state transition) upon receiving a triggering condition. Such a state machine may thus be defined by its states and the triggering conditions for the transitions between two states.

According to the state machine shown in FIG. 9, events leading to a transition from one state to another are indicated by arrows pointing to the new state starting from the old state as exemplified in FIG. 9. The state machine 900 allows state transitions between the one state (e.g., state 902) and one of the other three states (e.g., one of states 904, 906 and 908).

Depending on the echo signal distribution pattern, the controller may determine the number of receivers on the detection grid. In response to the echo signal distribution patterns shown in FIGS. 6-7, the controller is able to determine the four locations (00, 01, 10 and 11) of the detection grid. First, based on a suitable search algorithm, the controller is able to find the location of the first receiver. According to the state machine 900 shown in FIG. 9, the controller may find the location of the second receiver through a plurality of state transitions. In some embodiments, the controller may find the location of the second receiver through one state transition. In the worst case, the controller may find the location of the second receiver through three state transitions. For example, the first receiver is placed at a first location (00). The second receiver is placed at a fourth location (11). After finding the location of the first receiver, the controller may find the location of the second receiver directly through a state transition between the state 902 and the state 908. Alternatively, after finding the location of the first receiver, the controller may find the location of the second receiver through three state transitions. A first state transition is between the state 902 and the state 904. A second state transition is between the state 904 and the state 906. A third state transition is between the state 906 and the state 908.

Figure 10:
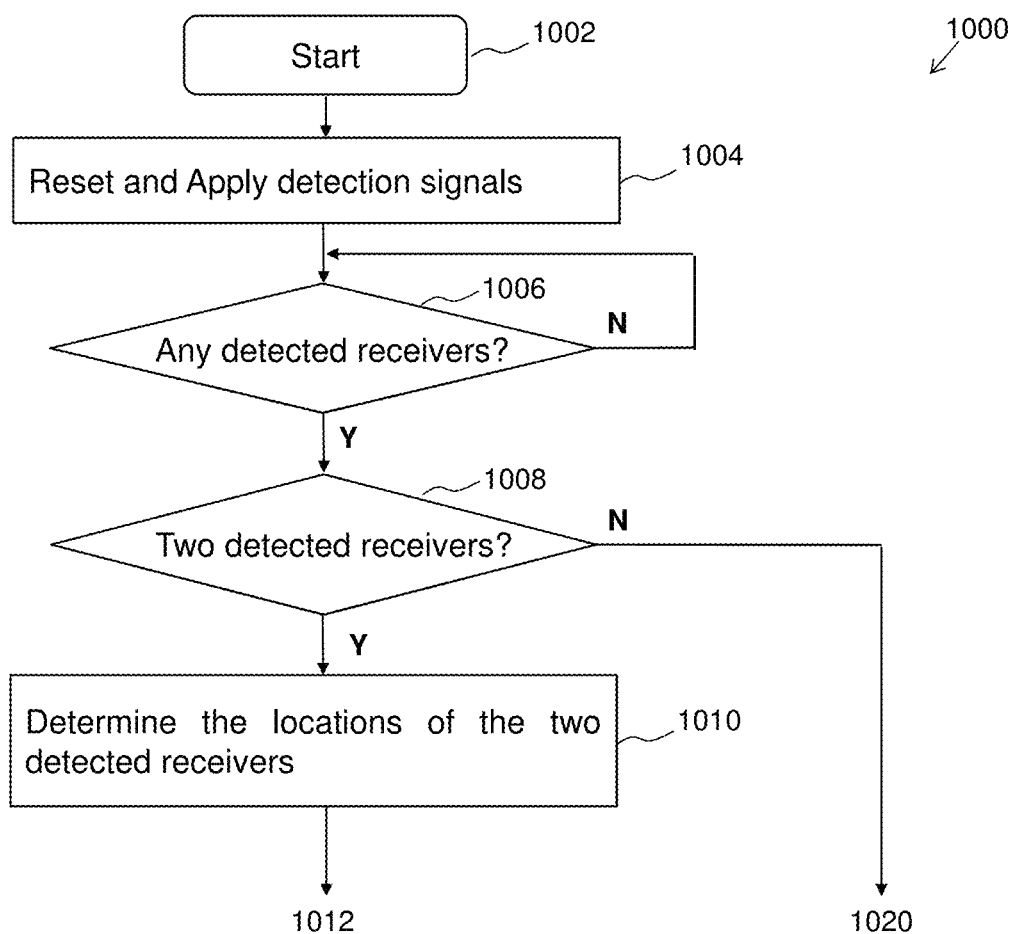
FIGS. 10-11 illustrate a flow chart of a method for detecting two receivers in accordance with various embodiments of the present application.
Figure 11:
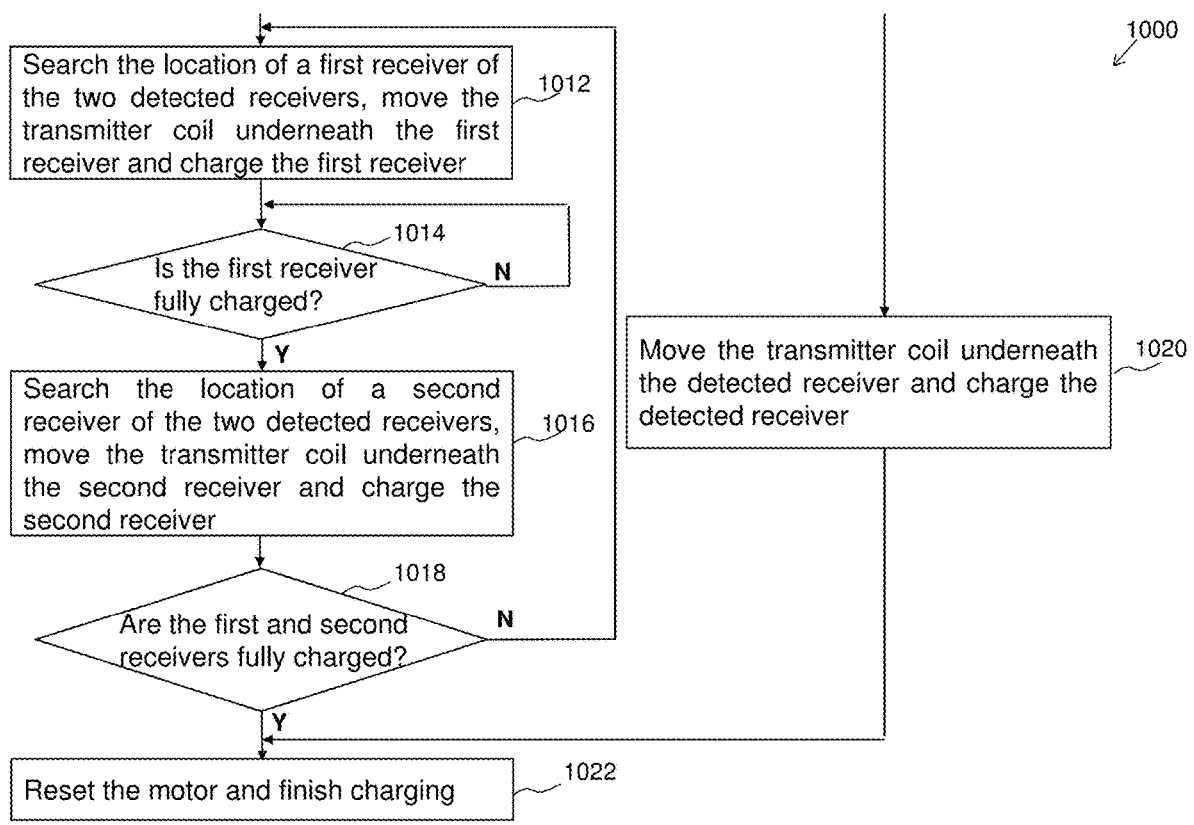

FIGS. 10-11 illustrate a flow chart of a method for detecting two receivers in accordance with various embodiments of the present application. This flow chart shown in FIGS. 10-11 is merely an example, which should not unduly limit the scope of the claims. One of ordinary skill in the art would recognize many variations, alternatives, and modifications. For example, various steps as illustrated in FIGS. 10-11 may be added, removed, replaced, rearranged and repeated.

FIG. 10 illustrates a first portion of the method 1000 in accordance with various embodiments of the present application. FIG. 11 illustrates a second portion of the method 1000 in accordance with various embodiments of the present application.

Referring back to FIG. 2, two receivers are placed on a detection grid. These two receivers may be embedded in two mobile phones respectively. The detection grid is in a charging pad. The charging pad further comprises a movable transmitter. The movable transmitter is moved by a two dimensional moving apparatus comprising two motors.

After detecting these two receivers, the movable transmitter is first moved underneath the first receiver. After fully charging the first receiver, the movable transmitter is moved from the first receiver to the second receiver. The moveable transmitter is used to provide wireless charging for the second receiver.

The method 1000 starts at step 1002, and then proceeds with step 1004 where a controller reset a plurality of control logic units such as registers. For example, various operation parameters measured previously and saved in the registers are reset before the controller proceeds further. Also at step 1004, the controller is configured to apply a plurality of detection signals. A plurality of echo signals is reflected from the receivers.

At step 1006, the controller determines whether any receivers are placed on the detection grid. At step 1006, if the controller cannot detect any receivers, the method 1000 proceeds to step 1006 again. Also at step 1006, if at least one receiver is detected, the method 1000 proceeds to step 1008. At step 1008, if two receivers have been detected, the method 1000 proceeds to step 1010. Otherwise, there is only one detected receiver. The method 1000 proceeds to step 1020. At step 1020, the controller is configured to move the transmitter coil underneath the one detected receiver and charge it. After fully charging the one detected receiver, the method proceeds to step 1022.

At step 1010, based on the echo signal distribution patterns (e.g., the echo signal distributions shown in FIGS. 4-7), the controller determines the locations of the two detected receivers. After determining the locations of the two detected receivers, the method 1000 proceeds to step 1012.

At step 1012, the controller is configured to find the location of the first receiver and move the transmitter coil underneath the first receiver, and charge the first receiver.

At step 1014, the controller determines whether the first receiver is fully charged. If the first receiver is not fully charged, the method 1000 repeats step 1014 again. Also at step 1014, if the first receiver is fully charged, the method 1000 proceeds to step 1016.

At step 1016, the controller is configured to find the location of the second receiver, move the transmitter coil underneath the second receiver and charge the second receiver.

At step 1018, the controller determines whether the second receiver is fully charged. If the second receiver is not fully charged, the method 1000 proceeds with step 1018 again. Also at step 1018, if the second receiver is fully charged, the method 1000 proceeds to step 1022.

At step 1022, the motors are reset and both receivers have been fully charged.

Figure 12:
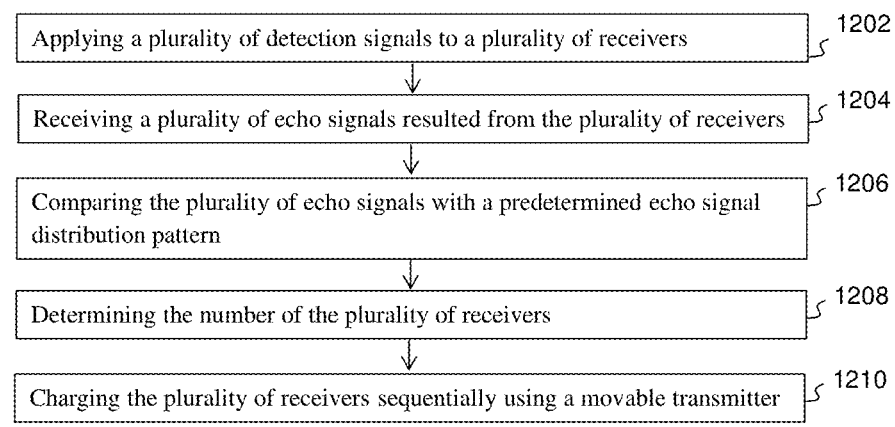
FIG. 12 illustrates a flow chart of controlling the wireless power transfer system shown in FIG. 1 in accordance with various embodiments of the present disclosure.

FIG. 12 illustrates a flow chart of controlling the wireless power transfer system shown in FIG. 1 in accordance with various embodiments of the present disclosure. This flowchart shown in FIG. 12 is merely an example, which should not unduly limit the scope of the claims. One of ordinary skill in the art would recognize many variations, alternatives, and modifications. For example, various steps illustrated in FIG. 12 may be added, removed, replaced, rearranged and repeated.

At step 1202, a plurality of detection signals is applied to a plurality of receivers.

At step 1204, a controller is configured to receive a plurality of echo signals resulted from the plurality of receivers.

At step 1206, the controller compares the plurality of echo signals with a predetermined echo signal distribution pattern.

At step 1208, the controller determines the number of the plurality of receivers.

At step 1210, the controller is configured to charge the plurality of receivers sequentially using a movable transmitter.

Figure 13:
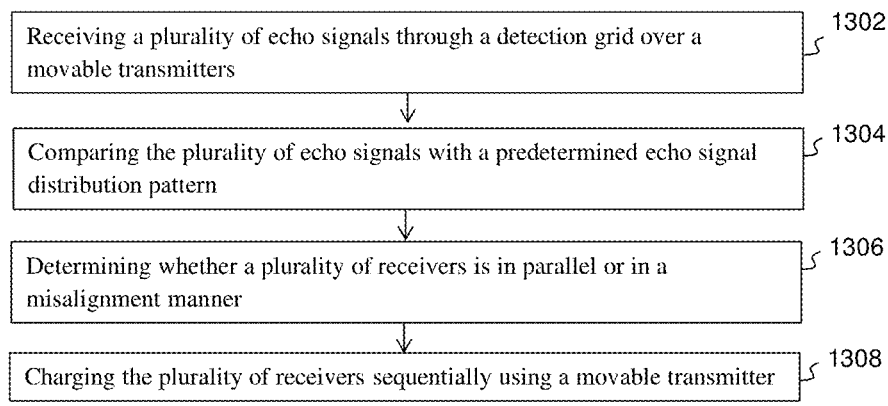
FIG. 13 illustrates another flow chart of controlling the wireless power transfer system shown in FIG. 1 in accordance with various embodiments of the present disclosure.

FIG. 13 illustrates another flow chart of controlling the wireless power transfer system shown in FIG. 1 in accordance with various embodiments of the present disclosure. This flowchart shown in FIG. 13 is merely an example, which should not unduly limit the scope of the claims. One of ordinary skill in the art would recognize many variations, alternatives, and modifications. For example, various steps illustrated in FIG. 13 may be added, removed, replaced, rearranged and repeated.

At step 1302, a controller is configured to receive a plurality of echo signals through a detection grid over a movable transmitter.

At step 1304, the controller is configured to compare the plurality of echo signals with a predetermined echo signal distribution pattern.

At step 1306, the controller determines whether a plurality of receivers is in parallel or in a misalignment manner.

At step 1308, the controller is configured to charge the plurality of receivers sequentially using a movable transmitter.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:

applying a plurality of detection signals to a plurality of receivers;

receiving a plurality of echo signals resulted from the plurality of receivers;

comparing the plurality of echo signals with a predetermined echo signal distribution pattern;

determining the number of the plurality of receivers through comparing a distance between a first group of echo signals and a second group of echo signals with a predetermined threshold value if the plurality of echo signals comprises two groups of echo signals, and comparing the number of echo signals with a threshold number of echo signals in one group if the plurality of echo signals comprises one group of echo signals; and charging the plurality of receivers sequentially using a movable transmitter.

2. The method of claim 1, further comprising:
detecting the plurality of receivers using a detection grid comprising a plurality of first detection coils oriented to a first direction and a plurality of second detection coils oriented to a second direction;
determining a location of a first receiver to be charged; and
moving the movable transmitter toward the location of the first receiver to be charged using a two dimensional moving apparatus.

3. The method of claim 2, wherein:
the two dimensional moving apparatus comprises a first motor configured to move the movable transmitter along the first direction and a second motor configured to move the movable transmitter along the second direction orthogonal to the first direction.

4. The method of claim 1, further comprising:
after determining the number of the plurality of receivers, determining whether a first receiver is in parallel with a second receiver based on comparing the plurality of echo signals with the predetermined echo signal distribution pattern.

5. The method of claim 4, further comprising:
after determining the first receiver is in parallel with the second receiver, determining two locations of the first receiver and the second receiver;
charging the first receiver by moving the movable transmitter toward a first location of the two locations; and
after fully charging the first receiver, charging the second receiver by moving the movable transmitter toward a second location of the two locations.

6. The method of claim 1, further comprising:
after determining the number of the plurality of receivers, determining whether a first receiver and a second receiver are arranged in a misalignment manner based on comparing the plurality of echo signals with the predetermined echo signal distribution pattern.

7. The method of claim 6, further comprising:
after determining that the first receiver and the second receiver are arranged in a misalignment manner, determining four possible locations of the first receiver and the second receiver;
finding a first location of the first receiver;
charging the first receiver by moving the movable transmitter toward the first location of the first receiver;
after fully charging the first receiver, finding a second location of the second receiver; and
charging the second receiver by moving the movable transmitter toward the second location of the second receiver.

8. A method comprising:
receiving a plurality of echo signals through a detection grid over a movable transmitter;
comparing a distance between a first group of echo signals and a second group of echo signals with a predetermined threshold value if the plurality of echo signals comprises two groups of echo signals, and comparing the number of echo signals with a threshold number of echo signals in one group if the plurality of echo signals comprises one group of echo signals;
determining whether a plurality of receivers is in parallel or in a misalignment manner; and
charging the plurality of receivers sequentially using a movable transmitter.

9. The method of claim 8, further comprising:
determining whether a receiver is placed adjacent to the movable transmitter using a detection grid over the movable transmitter, the detection grid comprising a plurality of first detection coils oriented to a first direction and a plurality of second detection coils oriented to a second direction.

10. The method of claim 8, further comprising:
determining whether one receiver or two receivers are placed adjacent to the movable transmitter using a detection grid over the movable transmitter, the detection grid comprising a plurality of first detection coils oriented to a first direction and a plurality of second detection coils oriented to a second direction.

11. The method of claim 10, further comprising:
after determining two receivers have been placed adjacent to the movable transmitter, searching a location of a first receiver of the two receivers;
charging the first receiver by moving the movable transmitter toward the location of the first receiver;
after fully charging the first receiver, searching a location of a second receiver of the two receivers; and
charging the second receiver by moving the movable transmitter toward the location of the second receiver.

12. The method of claim 10, further comprising:
after determining one receiver has been placed adjacent to the movable transmitter, charging the one receiver by moving the movable transmitter toward a location of the one receiver.

13. The method of claim 10, further comprising:
after determining two receivers have been placed adjacent to the movable transmitter, determining whether the two receivers are in parallel.

14. The method of claim 13, further comprising:
after determining that the two receivers are in parallel, finding two locations of the two receivers; and
charging the two receivers sequentially according to a state machine having two states, wherein the step of charging the two receivers sequentially is accomplished within one state transition.

15. The method of claim 13, further comprising:
after determining that the two receivers are arranged in a misalignment manner, finding four possible locations of the two receivers; and
charging the two receivers sequentially according to a state machine having four states, wherein the step of charging the two receivers sequentially is accomplished in a range from one state transition to three state transitions.

16. An apparatus comprising:
a movable transmitter;
a detection grid over the movable transmitter; and
a controller configured to apply a plurality of detection signals to a plurality of receivers over the detection grid, receive a plurality of echo signals resulted from the plurality of receivers, compare the plurality of echo signals with a predetermined echo signal distribution pattern, and determine the number of the plurality of receivers through comparing a distance between a first group of echo signals and a second group of echo signals with a predetermined threshold value if the plurality of echo signals comprises two groups of echo signals, and comparing the number of echo signals with a threshold number of echo signals in one group if the plurality of echo signals comprises one group of echo signals.

17. The apparatus of claim 16, further comprising a two dimensional moving apparatus, wherein:
after finding two receivers over the detection grid, the movable transmitter is moved to a first location underneath a first receiver by the two dimensional moving apparatus, and the movable transmitter is configured to charge the first receiver; and after fully charging the first receiver, the movable transmitter is moved from the first location to a second location underneath a second receiver by the two dimensional moving apparatus, and the movable transmitter is configured to charge the second receiver.

18. The apparatus of claim 17, wherein the two dimensional moving apparatus comprises:

a first motor configured to move the movable transmitter along a first direction; and a second motor configured to move the movable transmitter along a second direction, wherein the first direction is orthogonal to the second direction.

19. The apparatus of claim 17, wherein:

the first receiver is inside a first mobile phone;

the second receiver is inside a second mobile phone; and the movable transmitter, the detection grid and the controller are inside a charging pad.

20. The apparatus of claim 19, wherein:

the charging pad, the first mobile phone and the second mobile phone form a wireless power transfer system.

* * * * *